United States Patent

Kreider

[11] 3,857,888
[45] Dec. 31, 1974

[54] HALO/NITRO-SUBSTITUTED BENZALDEHYDE BIS(DIALKYLAMINOALKYL) MERCAPTALS AND CONGENERS

[75] Inventor: Eunice M. Kreider, Chicago, Ill.

[73] Assignee: G. D. Searle & Co., Chicago, Ill.

[22] Filed: Feb. 15, 1972

[21] Appl. No.: 226,525

Related U.S. Application Data

[63] Continuation-in-part of Ser. No. 832,469, June 11, 1969, abandoned.

[52] U.S. Cl. ......... 260/570.5 S, 71/121, 260/343.7, 260/501.1, 260/501.2, 260/501.21, 260/567.6 M, 260/567.6 P, 260/583 EE
[51] Int. Cl. ............................................ C07c 91/00
[58] Field of Search .............................. 260/570.5 S

[56] References Cited
UNITED STATES PATENTS
3,166,572   1/1965   Tweit .......................... 260/570.5 X Primary Examiner—Robert V. Hines
Attorney, Agent, or Firm—John M. Brown

[57] ABSTRACT

Preparation and the valuable biological properties — including anti-bacterial, anti-protozoal, anthelmintic, anti-fungal, anti-algal, anti-germinant, and anti-inflammatory activities — of chemical compounds of the formula

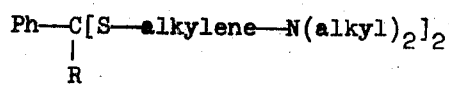

wherein Ph represents phenyl substituted by at least 1 halogen and/or nitro, R represents hydrogen or alkyl, and the alkyl and alkylene groups called for are preferably but not necessarily exclusively of lower order, are disclosed.

13 Claims, No Drawings

HALO/NITRO-SUBSTITUTED BENZALDEHYDE BIS(DIALKYLAMINOALKYL) MERCAPTALS AND CONGENERS

The application for Letters Patent securing the invention herein described and claimed is a continuation-in-part of applicant's prior copending application Ser. No. 832,469 filed June 11, 1969, and now abandoned.

This invention relates to halo/nitro-substituted benzaldehyde bis(dialkylaminoalkyl) mercaptals and congeners, and to processes for the preparation thereof. More particularly, this invention provides new, useful, and unobvious chemical compounds having the formula

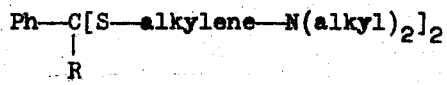

wherein Ph represents phenyl substituted by at least 1 halogen and/or nitro, R represents hydrogen or alkyl, and the alkyl and alkylene groups called for are preferably but not necessarily exclusively of lower order.

The contemplated halogens are fluorine, chlorine, bromine, and iodine. Positioning thereof about the benzene ring, like that of any nitro present, is not critical.

Lower alkyl includes methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight-or branched-chain, hydrocarbon radicals of empirical formula

wherein $n$ represents a positive integer less than 8. Among these radicals, methyl is an especially preferred embodiment of R.

Lower alkylene includes methylene, ethylene, trimethylene, propylene, tetramethylene, 1,1-dimethylethylene, pentamethylene, 2,2-dimethyltrimethylene, and like bivalent, saturated, acyclic, straight- or branched-chain, hydrocarbon radicals of empirical formula

wherein $n$ is defined as before. When $n$ is greater than 1 and less than 5, the enformulated alkylenes are especially advantageous.

Equivalent to the foregoing compounds for the purposes of this invention are acid addition and quaternary ammonium salts thereof having the formula

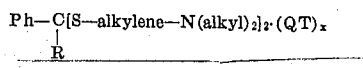

wherein Ph and R have the meanings previously set forth; Q represents hydrogen, lower alkyl, hydroxy(-lower alkyl), lower alkenyl such as allyl and methylallyl, or aralkyl such as benzyl or phenethyl; T represents 1 equivalent of an anion — for example, chloride, bromide, iodide, nitrate, phosphate, sulfate, sulfamate, methyl sulfate, ethyl sulfate, benzenesulfonate, toluenesulfonate, acetate, lactate, glycolate, succinate, malate, maleate, tartrate, citrate, gluconate, ascorbate, benzoate, cinnamate, or the like — which, in combination with the cationic portion of a salt aforesaid, is neither biologically nor otherwise undesirable; and $x$ represents a positive integer less than 3.

The compounds to which this invention relates are useful by reason of their valuable biological properties. Thus, for example, they are antibiotic agents effective against (1) bacteria such as *Bacillus subtilis, Escherichia coli, Salmonella paratyphi A, Erwinia sp.* and *Diplococcus pneumoniae;* (2) protozoa such as *Trichomonas vaginalis* and *Tetrahymena pyriformis* and *geleii;* (3) nematodes such as *Turbatrix aceti;* (4) fungi such as *Trichophyton mentagrophytes* and *Ceratocystis ulmi;* (5) algae such as *Chlorella vulgaris;* and (6) dicotyledoneae such as *Trifolium repens.* Another valuable biological property characteristic of the compounds of this invention is their anti-inflammatory activity.

This anti-bacterial utility of the instant compounds is evident from the results of standardized tests for their capacity to prevent the growth of *Bacillus subtilis, Escherichia coli, Salmonella paratyphi A,* and/or *Erwinia sp.* In these tests, nutrient broth (manufactured by Baltimore Biological Laboratories or Difco) is prepared at twice the concentration recommended by the manufacturer, sterilized, and inoculated with 2 percent (by volume) of a culture of *B. subtilis, E. coli, S. paratyphi A,* or *Erwinia sp.* Meanwhile, compound is heated in sterile distilled water at a concentration of 2,000 γ per ml. and a temperature of 80°C. for 20 min. An equivolume mixture of this compound preparation and the inoculated broth is incubated aerobically at 37°C. and then examined grossly for growth of the test organism. The incubation period is 24–48 hr. for *Erwinia sp.* and 20–24 hr. for the other three organisms. If growth of the test organism is observed, the compound is considered inactive. If no such growth is observed, the incubated mixture is serially diluted and mixed with an inoculated broth of the same composition as before expecting that the concentration is halved and 1 percent (by volume) of the culture instead of 2 percent is incorporated. Amounts of the latter broth added are such that concentrations of 100, 10 and 1 γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound. The products of Examples 2, 6, and 13 hereinafter were found active against *B. subtilis* and *E. coli.* at 100 γ/ml. and 400 γ/ml., respectively, in the foregoing test. The products of Examples 5A, 8, and 9A hereinafter were found active against *S. paratyphi A* and *Erwinia sp.* at 1,000 γ/ml. and 100 γ/ml., respectively, in the foregoing test.

Further evidence of the anti-bacterial utility of the instant compounds is provided by a standardized test for their capacity to prevent the growth of *Diplococcus pneumoniae.* In this test, sterile blood agar plates are inoculated with *D. pneumoniae,* approximately 5 mg. of compound is placed on the surface of each plate so as to cover a circle approximately 4 mm. in diameter, and the plates are thereupon aerobically incubated for 24 hr. at 36°C. Clear zones of inhibition signify the utility in question. The products of Examples 3A, 11 and 19 hereinafter were found active against *D. pneumoniae* in the foregoing test.

The anti-protozoal utility of the instant compounds is evident from the results of a standardized test for their capacity to immobilize *Trichomonas vaginalis.* In this test, 80 volumes of a modified Diamond medium prepared by mixing 1,200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 27,000 parts of distilled water, adjusting the pH to 6.8 with aqueous 4 percent sodium hydroxide; incorporating 30 parts of agar (Baltimore Biological Laboratories); boiling for 1 minute to dissolve the agar; and sterilizing is diluted with 20 volumes of sterile Dubos medium serum. The resultant medium is inoculated with 2 percent (by volume) of either a 48 hr. or a 72 hr. culture of T. vaginalis. Meanwhile, compound is heated in sterile distilled water at a concentration of 2,000 γ per ml. and a temperature of 80°C. for 20 min. An equivolume mixture of this compound preparation and the inoculated medium is incubated anaerobically at 37°C. for 48 hr. and then examined microscopically for the presence of motile trichomonads. If any are observed, the compound is considered inactive. If no motile trichomonads are observed, the incubated mixture is serially diluted and mixed with an inoculated medium of the same composition as that described above expecting that 54,000 parts of distilled water instead of 27,000 parts and 1 percent (by volume) of the culture instead of 2 percent are incorporated. Amounts of the latter medium added are such that concentrations of 100, 10 and 1 γ of compound per ml. results. The mixtures thus obtained are incubated as before and then examined microscopically for motile trichomonads. Potency is expressed as the minimum concentration at which no motile trichomonads are discernible. Controls are provided by concurrent incubations identical with the foregoing except for the absence of compound. The products of Examples 5B, 15, and 19 hereinafter were found active at 1,000 γ/ml. against T. vaginalis in the foregoing test.

Further evidence of the anti-protozoal activity of the instant compounds is provided by a standardized test for their capacity to immobilize Tetrahymena pyriformis. In this test, a nutrient broth consisting of 12 gm. of proteose peptone, 8 gm. of sucrose, and 500 ml. of water is sterilized and inoculated with 10 percent (by volume) of an axenic culture of T. pyriformis. Meanwhile, compound is heated in sterile distilled water at a concentration of 2,000 γ per ml. and a temperature of 80°C. for 20 min. An equivolume mixture of this compound preparation and the inoculated medium is incubated aerobically at 32°C. for 48 hr. and then examined microscopically for the presence of motile tetrahymena. If any are observed, the compound is considered inactive. If no motile tetrahymena are observed, the incubated mixture is serially diluted and mixed with an inoculated medium of the same composition as that described above excepting that 1,000 parts of distilled water instead of 500 parts and 5 percent (by volume) of the culture instead of 10 percent are incorporated. Amounts of the latter medium added are such that concentrations of 100, 10, and 1 γ of compound per ml. result. The mixtures thus obtained are incubated as before and then examined microscopically for motile tetrahymena. Potency is expressed as the minimum concentration at which no motile tetrahymena are discernible. Controls are provided by concurrent incubations identical with the foregoing except for the absence of compound. The products of Examples 5A, 14 and 15 hereinafter were found active at 1,000, 100, and 10 γ/ml., respectively, against T. pyriformis in the foregoing test.

Still further evidence of the anti-protozoal activity of the instant compounds is provided by a standardized test for their capacity to inhibit the growth of Tetrahymena geleii. In this test, a nutrient broth consisting of 12 gm. of proteose peptone, 8 gm. of sucrose, and 1000 ml. of water is sterilized, inoculated with an axenic culture of T. geleii, and incubated at approximately 25°C. for 24 hr., whereupon 0.5 ml. quantities are aseptically transferred to each of two test tubes, one of which contains approximately 5 mg. of compound. After a second 24-hr. incubation at approximately 25°C., growths of the organism are compared by microscopic examination. The products of Examples 3A, 6, and 13 hereinafter were found active against T. geleii in the foregoing test.

The anthelmintic utility of the instant compounds is evident from the results of a standardized test for their capacity to immobilize Turbatrix aceti, a representative nematode. In this test, compound is heated in sterile distilled water at a concentration of 2,000 γ per ml. and a temperature of 80°C. for 20 min., whereupon an equivolume mixture of this compound preparation and a washed aqueous suspension of T. aceti containing approximately 2,000 nematodes per ml. is incubated aerobically at room temperature for 48 hr. and then examined grossly for the presence of motile nematodes. If any are observed, the compound is considered inactive. In no motile nematodes are observed, the incubated mixture is serially diluted and mixed with a freshly prepared and washed aqueous suspension of T. aceti containing approximately 1,000 nematodes per ml. in amounts such that concentrations of 100, 10 and 1 γ of compound per ml. result. The mixtures thus obtained are incubated as before and then examined grossly for the presence of motile nematodes. Potency is expressed at the minimum concentration at which no motile nematodes are discernible. Controls are provided by concurrent incubations identical with the foregoing except for the absence of compound. The products of Examples 6, 15 and 19 hereinafter were found active at 10, 100, and 1,000 γ/ml., respectively, against T. aceti in the foregoing test.

The anti-fungal utility of the instant compounds is evident from the results of standardized tests for their capacity to prevent the growth of Trichophyton mentagrophytes and/or Ceratocystis ulmi. In these tests, two concentrations of Sabouraud dextrose agar (manufactured by Baltimore Biological Laboratories or Difco) are prepared, one as recommended by the manufacturer and the other at twice this concentration. These preparations are sterilized and then maintained in a fluid state at 80°C. Meanwhile, compound is heated in sterile distilled water at a concentration of 2,000 γ per ml. and a temperature of 80°C. for 20 min. An equivolume mixture of this preparation and the double strength agar is serially diluted and mixed with the single strength agar in amounts such that concentrations of 1,000, 100, 10 and 1 γ of test compound per ml. result. The mixtures thus obtained are allowed to cool and solidify, whereupon they are surface-inoculated with a suspension of T. mentagrophytes or C. ulmi and then incubated aerobically at room temperatures for 6–7 days. Activity is determined by gross examination, and potency is expressed as the minimum concentration at which no growth of the test organism is discernible. Controls are provided by concurrent incubations identical with the foregoing except for the absence of compound. The products of Examples 6, 11 and 19 hereinafter were found active against *T. mentagrophytes* and *C. ulmi* at 1,000 γ/ml. in the foregoing test.

The anti-algal utility of the instant compounds is evident from the results of a standardized test for their capacity to prevent the growth of *Chlorella vulgaris*. In this test, a sterile Bristol agar plate is inoculated with *C. vulgaris*, approximately 5 mg. of compound is placed on the surface of the plate so as to cover a circle roughly 4 mm. in diameter, and the plate is incubated at 25°C. under artificial light for 5–7 days. A clear zone of inhibition signifies the utility in question. Copper sulfate serves as reference standard. The products of Examples 6, 15 and 19 hereinafter were found active against *C. vulgaris* in the foregoing test.

The anti-germinant utility of the instant compounds is evident from the results of a standardized test for their capacity to prevent the germination of white clover (*Trifolium repens* — a representative dicotyledon). In this test, three 42.5 mm. (diameter) filter paper discs are stacked in each of two 60 mm. Petri dishes, each stack is moistened with 2 ml. of distilled water, 10 white clover seeds are arranged atop each stack at approximately equal intervals around the periphery, approximately 5 mg. of compound is placed in the center of one seed circle (The other serves as control.), the dishes are covered with glass lids and then incubated at room temperatures for 10 days, and germination in the control dish is thereupon compared with that in the dish containing seeds exposed to test compound. The products of Examples 6, 15 and 19 hereinafter were found active against *T. repens* in the foregoing test.

The anti-inflammatory utility of the instant compounds is evident from the results of a standardized test for their capacity to inhibit the edema induced in rats by injection of carrageenin. The procedure is a modification of one described by Winter, et al., Proc. Soc. Exp. Biol. Med., 111, 544 (1962). Compound is administered subcutaneously or intragastrically, dissolved or suspended in 0.5 ml. of aqueous 0.86 percent sodium chloride, propylene glycol, a mixture of these vehicles, or corn oil, to each of 10 male rats weighing 100–130 gm. A like group of rats to which is identically and concurrently administered vehicle alone serves as controls. Precisely 1 hour later, each animal is injected under the plantar surface of each hind foot with 0.1 ml. of an aqueous 1 percent of carrageenin (Marine Colloids, Inc., Type 402). A compound is considered anti-inflammatory if the average total circumference (T) of the two hind feet in the group treated therewith, which is measured in arbitrary units 5 hr. after the carrageenin injection, is significantly (P 0.05) less than the corresponding value (C) for the control group. The products of Examples 6, 11, and 19 hereinafter were found active at 25 mg. subcutaneously in the foregoing anti-inflammatory test.

Those skilled in the art will recognize that observations of activity in standardized tests for particular biological effects are fundamental to the development of valuable new drugs, both veterinary and human. Distinct from such applications, anti-algal compounds are adapted to the conditioning of boiler feedwater and the like, and anti-germinant compounds serve as herbicides.

Preparation of the subject compounds proceeds by prolonged contact between an aldehyde or ketone of the formula

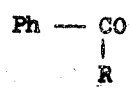

and an aminothiol, or salt thereof, having the formula

HS — alkylene — N(alkyl)$_2$ in acetic acid solution, using hydrogen chloride or boron trifluoride etherate as a condensing agent. (Ph and R in the first formula retain the meanings previously assigned.) When hydrogen chloride is the condensing agent of choice, contact is initiated at around 15°C. If sufficient hydrogen chloride be present, the product is the dihydrochloride salt. Addition of excess bicarbonate to the product affords the free base, which, upon simple admixture with 1 or 2 equivalents of any inorganic or strong organic acid wherein the anionic component conforms to T above, is converted to the corresponding acid addition salt. Alternatively, the base can be quaternized by contacting with an ester of the formula

wherein the definition of Q' is identical with that of Q above, excepting that Q' does not represent hydrogen, and the definition of T remains as before. Quaternization is ordinarily carried out at 25°–100°C. in an inert solvent medium such as chloroform, acetone, methanol, or the like, and is completed in from 1 to 48 hr. A closed system is used if the involved ester is a gas at operating temperatures.

The following examples describe compounds illustrative of the present invention and methods which have been devised for the preparation thereof. Throughout the examples hereinafter set forth, temperatures are given in degrees centigrade and relative amounts of materials are in parts by weight, except as otherwise noted.

EXAMPLE 1 o-Fluorobenzaldehyde bis(2-dimethylaminoethyl) mercaptal dihydrochloride. A solution of 310 parts of o-fluorobenzaldehyde and 705 parts of 2-dimethylaminoethanethiol hydrochloride in 2,000 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 15 volumes of a 1:1 (by volume) mixture of ether and dioxane, precipitating an oil which is isolated by chilling and decanting the supernatant liquid. The oil is solidified by stirring with 2-propanol. The solid is filtered, consecutively washed with hot chloroform and ether, and dried at 65° to give o-fluorobenzaldehyde bis(2-dimethylaminoethyl) mercaptal dihydrochloride melting at 223.5°–225°. The product has the formula

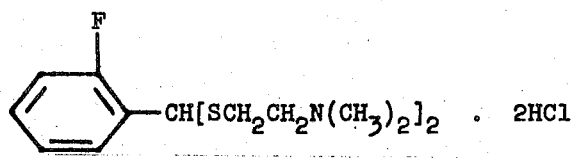

EXAMPLE 2 m-Chlorobenzaldehyde bis(2-diethylaminoethyl) mercaptal dihydrochloride. A solution of 175 parts of m-chlorobenzaldehyde and 422 parts of 2-diethylaminoethanethiol hydrochloride in 2,000 parts of glacial acetic acid is stirred at around 15° for 1 hour while hydrogen chloride is passed through, whereupon introduction of hydrogen chloride is stopped and the reaction mixture allowed to stand at room temperatures for 72 hours. The mixture is then stirred into approximately 15 volumes of a 1:1 (by volume) mixture of ether and dioxane. A solid precipitate forms. The precipitated mixture is chilled, whereupon the precipitate is separated by filtration, recrystallized from a mixture of chloroform and 2-propanol, consecutively washed with 2-propanol and ether, and dried at 65° to give m-chlorobenzaldehyde bis(2-diethylaminoethyl) mercaptal dihydrochloride sintering at 176° and melting at 195°–198°. The product has the formula

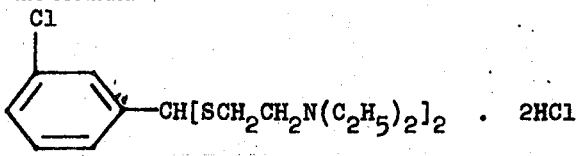

EXAMPLE 3

A. p-Chlorobenzaldehyde bis(2-dimethylaminoethyl) mercaptal dihydrochloride. A solution of 351 parts of p-chlorobenzaldehyde and 705 parts of 2-dimethylaminoethanethiol hydrochloride in 2,500 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 6 volumes of a 2:1 (by volume) mixture of ether and dioxane. A solid precipitate forms. The precipitated mixture is chilled, whereupon the precipitate is filtered out and consecutively washed with ether, hot 2-propanol, and hot chloroform, then dried at 65° to give p-chlorobenzaldehyde bis(2-dimethylaminoethyl) mercaptal dihydrochloride melting at 232°–234°. The product has the formula

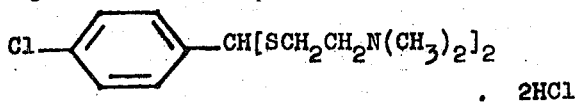

B. p-Chlorobenzaldehyde bis(2-dimethylaminoethyl) mercaptal. A mixture of 45 parts of p-chlorobenzaldehyde bis(2-dimethylaminoethyl) mercaptal dihydrochloride and 450 parts of aqueous 5 percent sodium bicarbonate is extracted with chloroform. The chloroform extract is consecutively washed with aqueous 2 percent sodium hydroxide and water, dried over anhydrous potassium carbonate, and stripped of solvent by vacuum distillation. The oily residue is p-chlorobenzaldehyde bis(2-dimethylaminoethyl) mercaptal.

C. p-Chlorobenzaldehyde bis(2-dimethylaminoethyl) mercaptal dimethiodide. To a solution of 37 parts of p-chlorobenzaldehyde bis(2-dimethylaminoethyl) mercaptal in 370 parts of chloroform is added 30 parts of methyl iodide. The resultant solution is heated at the boiling point under reflux for 3 min., then stripped of solvent by vacuum distillation. The residue is recrystallized from a mixture of methanol and ether to give p-chlorobenzaldehyde bis(2-dimethylaminoethyl) mercaptal dimethiodide melting at approximately 240.3°–241.5° with decomposition.

EXAMPLE 4 p-Chlorobenzaldehyde bis(2-diethylaminoethyl) mercaptal dioxalate. To a stirred solution of 88 parts of p-chlorobenzaldehyde and 212 parts of 2-diethylaminoethanethiol hydrochloride in 500 parts of glacial acetic acid is added 125 parts of boron trifluoride etherate. Stirring is continued at room temperatures for 2½ hours, then discontinued while the reaction mixture stands at room temperatures for 72 hours. Approximately 5 volumes of water is added, followed by sufficient sodium bicarbonate to adjust the pH to 5. The resultant mixture is extracted with chloroform. The chloroform extract is consecutively washed with aqueous 2 percent sodium hydroxide and water, dried over anhydrous sodium sulfate, and stripped of solvent by vacuum distillation. The residual clear brown liquid is taken up in 5 volumes of methanol; and the methanol solution is solidified with oxalic acid, filtered, and diluted with ether to the point of incipient cloudiness. On chilling, a solid precipitate forms. The precipitate is isolated by filtration, washed with methanol, and dried at 65° to give p-chlorobenzaldehyde bis(2-diethylaminoethyl) mercaptal dioxalate melting at approximately 129°–130°. The product has the formula

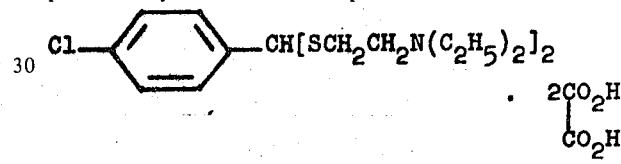

EXAMPLE 5

A. p-Bromobenzaldehyde bis(2-dimethylaminoethyl mercaptal dihydrochloride. A solution of 231 parts of p-bromobenzaldehyde and 353 parts of 2-dimethylaminoethanethiol hydrochloride in 2,500 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 12 volumes of a 1:1 (by volume) mixture of ether and dioxane. A solid precipitate forms. The precipitated mixture is chilled, whereupon the precipitate is filtered out, consecutively washed with hot chloroform and ether, and dried at 65° to give p-bromobenzaldehyde bis(2-dimethylaminoethyl) mercaptal dihydrochloride melting at 213°–215°. The product has the formula

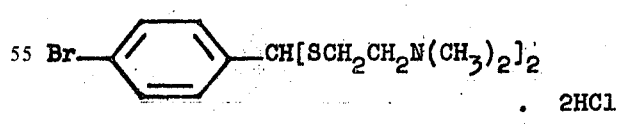

B. p-Bromobenzaldehyde bis(2-dimethylaminoethyl) mercaptal dimethiodide. A solution of 3 parts of p-bromobenzaldehyde bis(2-dimethylaminoethyl) mercaptal dihydrochloride in 30 parts of water is neutralized with solid sodium bicarbonate. The resultant mixture is extracted with chloroform. The chloroform extract is dried over anhydrous potassium carbonate and then mixed with 3 parts of methyl iodide. Sufficient ether is thereupon added to induce precipitation. The precipitate is filtered out and recrystallized from a cold mixture of methanol and ether to give p-bromobenzaldehyde bis(2-dimethylaminoethyl) mercaptal dimethiodide melting at approximately 243° with decomposition.

EXAMPLE 6 p-Bromobenzaldehyde bis(2-diethylaminoethyl) mercaptal dihydrochloride. A solution of 231 parts of p-bromobenzaldehyde and 422 parts of 2-diethylaminoethanethiol hydrochloride in 2,500 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 12 volumes of a 1:1 (by volume) mixture of ether and dioxane. A solid precipitate forms. The precipitated mixture is chilled, whereupon the precipitate is filtered out, consecutively washed with ether, hot 2-propanol, and ethyl acetate, and dried at 65° to give p-bromobenzaldehyde bis(2-diethylaminoethyl) mercaptal dihydrochloride melting at 223°–225°. The product has the formula

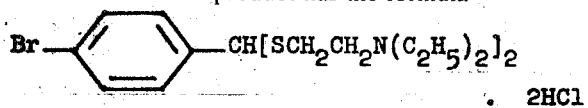

EXAMPLE 7 p-Bromobenzaldehyde bis(2-diisopropylaminoethyl) mercaptal dioxalate. A solution of 30 parts of p-bromobenzaldehyde and 52 parts of 2-diisopropylaminoethanethiol in 100 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 30 volumes of a 1:1 (by volume) mixture of ether and dioxane, precipitating an oil which is isolated by chilling and decanting the supernatant liquid. The oil is taken up in approximately 10 volumes of aqueous 5 percent sodium bicarbonate, and the resultant mixture is extracted with chloroform. The chloroform extract is consecutively washed with aqueous 2 percent sodium hydroxide and water, dried over anhydrous sodium sulfate, and stripped of solvent by vacuum distillation. The yellow liquid residue is dissolved in 10 volumes of methanol, and the methanol solution is acidified with oxalic acid and then filtered. Sufficient ether is added to the filtrate to induce incipient precipitation. On cooling, a white crystalline solid is thrown down which, filtered off, consecutively washed with chloroform and ether, and dried in air, affords p-bromobenzaldehyde bis(2-diisopropylaminoethyl) mercaptal dioxalate melting at 129°–131°. The product has the formula

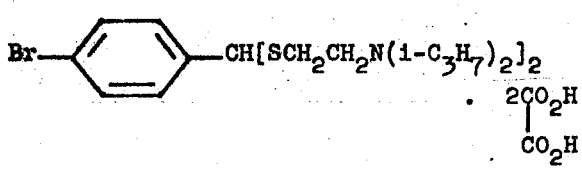

EXAMPLE 8 p-Chlorobenzaldehyde bis(3-dimethylaminopropyl) mercaptal dihydrochloride. A solution of 88 parts of p-chlorobenzaldehyde and 149 parts of 3-dimethylaminopropanethiol in 500 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 60 volumes of a 1:1 (by volume) mixture of ether and dioxane. A solid precipitate forms. The precipitated mixture is chilled, whereupon the precipitate is filtered out, consecutively washed with hot chloroform and ether, and dried at 65° to give p-chlorobenzaldehyde bis(3-dimethylaminopropyl) mercaptal dihydrochloride melting at 218.5°–220°. The product has the formula

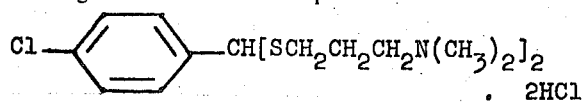

EXAMPLE 9

A. p-Bromobenzaldehyde bis(3-dimethylaminopropyl) mercaptal dihydrochloride. A solution of 231 parts of p-bromobenzaldehyde and 298 parts of 3-dimethylaminopropanethiol in 1,000 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 30 volumes of 1:1 (by volume) mixture of ether and dioxane. A solid precipitate forms. The precipitated mixture is chilled, whereupon the precipitate is filtered out, consecutively washed with hot chloroform and ether, and dried at 65° to give p-bromobenzaldehyde bis(3-dimethylaminopropyl) mercaptal dihydrochloride melting at 226°–227.5°. The product has the formula

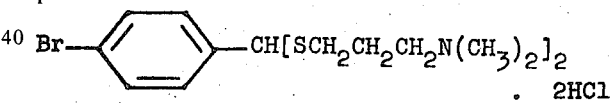

B. p-Bromobenzaldehyde bis(3-dimethylaminopropyl) mercaptal dimethiodide. A solution of 19 parts of p-bromobenzaldehyde bis(3-dimethylaminopropyl) mercaptal dihydrochloride in 190 parts of water is neutralized with aqueous 2 percent hydroxide. The resultant mixture is extracted with chloroform. The chloroform extract is dried over anhydrous potassium carbonate and stripped of solvent by vacuum distillation. The residue is mixed with 38 parts of methyl iodide. Excess methyl iodide is removed by heating at 90°. The resultant product is p-bromobenzaldehyde bis(3-dimethylaminopropyl) mercaptal dimethiodide which, recrystallized from a mixture of methanol and ether and dried at 65°, melts at 162°–163.5°.

EXAMPLE 10

A. 3-Dimethylamino-2-methylpropanethiol. A mixture of 85 parts of 3-dimethylamino-2-methylpropyl chloride hydrochloride and 38 parts of thiourea in 300 parts of water is heated at the boiling point under reflux for 4 hours, then cooled and diluted with a solution of approximately 41 parts of sodium hydroxide in 100 parts of water. The resultant solution is saturated with sodium chloride, whereupon it is extracted with ether, then neutralized with acetic acid, and finally again extracted with ether. The extracts are combined, dried over anhydrous potassium carbonate, stripped of solvent by distillation, and distilled in vacuo. The fraction boiling at approximately 30°–31° under 1.2 mm. of mercury pressure is 3-dimethylamino-2-methylpropanethiol.

B. p-Chlorobenzaldehyde bis(3-dimethylamino-2-methylpropyl) mercaptal dioxalate. A solution of 176 parts of p-chlorobenzaldehyde and 333 parts of 3-dimethylamino-2-methylpropanethiol in 500 parts of glacial acetic acid is stirred at around 15° for 1 hour while hydrogen chloride is passed through, whereupon introduction of hydrogen chloride is stopped and the resultant mixture allowed to stand at room temperatures overnight. The mixture is then stirred into approximately 60 volumes of a 1:1 (by volume) mixture of ether and dioxane, precipitating an oil which is isolated by chilling and decanting the supernatent liquid. The oil is taken up in 10 volumes of aqueous 5 percent sodium bicarbonate, and the resultant mixture is extracted with chloroform. The chloroform extract is consecutively washed with aqueous 1 percent sodium hydroxide and water, dried over anhydrous potassium carbonate, and stripped of solvent by vacuum distillation. The residual yellow liquid is taken up in 10 volumes of methanol; and the methanol solution is acidified with oxalic acid, filtered, and diluted with ether to the point of incipient precipitation. Upon chilling, a solid precipitate forms. The precipitate is filtered off, consecutively washed with methanol and ether, and dried at 65° to give p-chlorobenzaldehyde bis(3-dimethylamino-2-methylpropyl) mercaptal dioxalate sintering at 161° and melting at 166°–168° with decomposition. The product has the formula

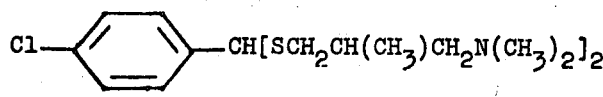

EXAMPLE 11 p-Chloroacetophenone bis(2-dimethylaminoethyl) mercaptal dihydrochloride. A solution of 387 parts of p-chloroacetophenone and 715 parts of 2-dimethylaminoethanethiol hydrochloride in 2,500 parts of glacial acetic acid is stirred at around 15° for 2 hours while hydrogen chloride is passed through and a dark red color develops, whereupon introduction of hydrogen chloride is stopped and the reaction mixture allowed to stand at room temperatures overnight. The mixture is then stirred into approximately 12 volumes of a 1:1 (by volume) mixture of ether and dioxane, precipitating a yellow solid which is isolated by chilling and filtering. The resulting material is p-chloroacetophenone bis(2-dimethylaminoethyl) mercaptal dihydrochloride which, consecutively washed with ether, hot 2-propanol, and a cold 1:1 (by volume) mixture of dichloromethane and 2-propanol, and then dried at 65°, melts at 228°–230°. The product has the formula

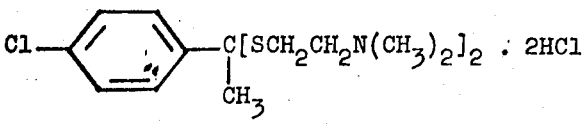

EXAMPLE 12 o-Bromoacetophenone bis(3-dimethylamino-2-methylpropyl) mercaptal dioxalate. Substitution of 200 parts of o-bromoacetophenone for the p-chlorobenzaldehyde called for in Example 10B affords, by the procedure there detailed, o-bromoacetophenone bis(3-dimethylamino-2-methylpropyl) mercaptal dioxalate, having the formula

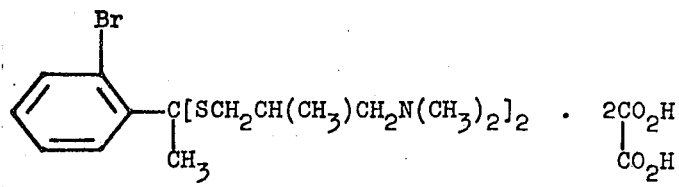

Example 13

2,4-Dichlorobenzaldehyde bis(2-dimethylaminoethyl) mercaptal dihydrochloride. A solution of 438 parts 0f 2,4-dichlorobenzaldehyde and 705 parts of 2-dimethylaminoethanethiol hydrochloride in 2,000 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 15 volumes of a 1:1 (by volume) mixture of ether and dioxane. The mixture thus obtained is chilled and the solid precipitate formed therein filtered off, consecutively washed with 2-propanol, hot chloroform, and ether, and then dried at 65°. The product thus isolated is 2,4-dichlorobenzaldehyde bis(2-dimethylaminoethyl) mercaptal dihydrochloride melting at 223°–225.5°, the formula of which is

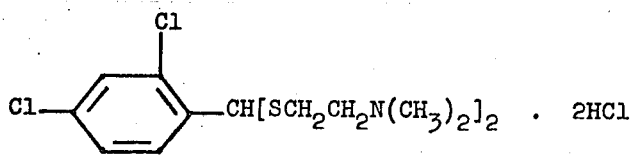

EXAMPLE 14

2,4-Dichlorobenzaldehyde bis(2-diethylaminoethyl) mercaptal dioxalate. Substitution of 110 parts of 2,4-dichlorobenzaldehyde for the p-chlorobenzaldehyde called for in Example 4 affords, by the procedure there detailed, 2,4-dichlorobenzaldehyde bis(2-diethylaminoethyl) mercaptal dioxalate melting at 167°–169° with decomposition. The product has the formula

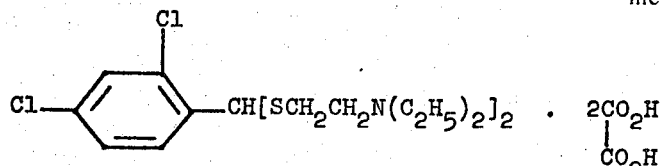

EXAMPLE 15

2,4-Dichlorobenzaldehyde bis(2-diisopropylaminoethyl) mercaptal dioxalate. A solution of 219 parts of 2,4-dichlorobenzaldehyde and 405 parts of 2-diisopropylaminoethanethiol in 1,000 parts of glacial acetic acid is stirred at around 15° for 1 hour while hydrogen chloride is passed through, whereupon introduction of hydrogen chloride is stopped and the reaction mixture allowed to stand at room temperatures for 72 hours. The mixture is then stirred into approximately 20 volumes of a 1:1 (by volume) mixture of ether and dioxane, precipitating an oil which is isolated by chilling and decanting the supernatent liquid. The oil is taken up in benzene and the benzene solution is washed with an excess of aqueous 5 percent sodium bicarbonate, dried over anhydrous sodium sulfate, and stripped of solvent by vacuum distillation. The residue is taken up in 5 volumes of methanol; and the methanol solution is acidified with oxalic acid, filtered, and diluted with ether to the point of incipient cloudiness. On chilling, a solid white precipitate forms. The precipitate is isolated by filtration and dried at 65°. The product thus obtained is 2,4-dichlorobenzaldehyde bis(2-diisopropylaminoethyl) mercaptal dioxalate melting at approximately 145°–146°. It has the formula

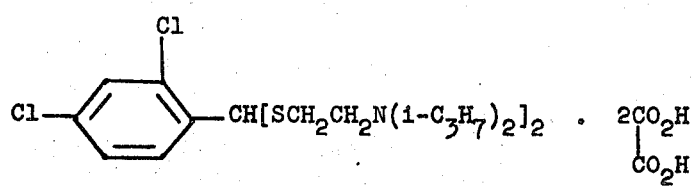

EXAMPLE 16

2,6-Dichlorobenzaldehyde bis(2-diethylaminoethyl) mercaptal dihydrochloride. A solution of 219 parts of 2,6-dichlorobenzaldehyde and 422 parts of 2-diethylaminoethanethiol hydrochloride in 1,500 parts of glacial acetic acid is stirred at around 15° for 1 hour while hydrogen chloride is passed through, whereupon introduction of hydrogen chloride is stopped and the reaction mixture is allowed to stand at room temperatures for 72 hours. The mixture is then stirred into approximately 20 volumes of a 1:1 (by volume) mixture of ether and dioxane. A solid precipitate forms. The precipitated mixture is chilled, whereupon the precipitate is filtered off, consecutively washed with hot 2-propanol and ether, and dried at 65° to give 2,6-dichlorobenzaldehyde bis(2-diethylaminoethyl) mercaptal dihydrochloride melting at 240°–243°. The product has the formula.

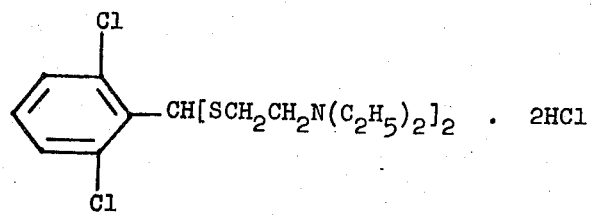

EXAMPLE 17

2,6-Dichlorobenzaldehyde bis(3-dimethylamino-2-methylpropyl) mercaptal dihydrochloride. A solution of 219 parts of 2,6-dichlorobenzaldehyde and 333 parts of 3-dimethylamino-2-methylpropanethiol in 500 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 60 volumes of a 1:1 (by volume) mixture of ether and dioxane. A solid precipitate forms. The precipitated mixture is chilled, whereupon the precipitate is separated by filtration, consecutively washed with 2-propanol and ether, recrystallized from a mixture of chloroform and ether, and dried at 65° to give 2,6-dichlorobenzaldehyde bis(3-dimethylamino-2-methylpropyl) mercaptal dihydrochloride melting at approximately 195°–196.5°. The product has the formula

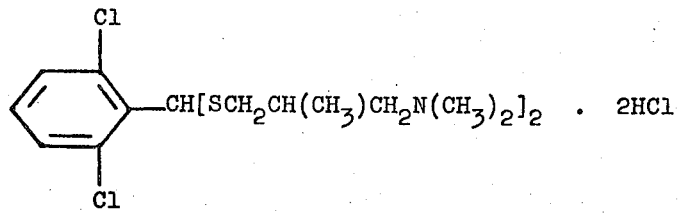

EXAMPLE 18 o-Nitrobenzaldehyde bis(2-dimethylaminoethyl) mercaptal dihydrochloride. A solution of 348 parts of o-nitrobenzaldehyde and 705 parts of 2-dimethylaminoethanethiol hydrochloride in 1,500 parts of glacial acetic acid is stirred at around 15° for 1 hour while hydrogen chloride is passed through, whereupon introduction of hydrogen chloride is stopped and the reaction mixture allowed to stand at room temperatures overnight. The mixture is then stirred into approximately 20 volumes of a 1:1 (by volume) mixture of ether and dioxane, precipitating an oil which is isolated by chilling and decanting the supernatent liquid. The oil is solidified by stirring with 2-propanol. The solid is filtered, consecutively washed with chloroform and ether, and dried at 65° to give o-nitrobenzaldehyde bis(2-dimethylaminoethyl) mercaptal dihydrochloride melting at 212°–214°. The product has the formula

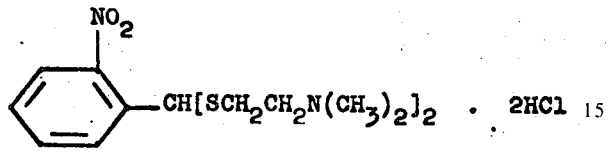

EXAMPLE 19 p-Nitrobenzaldehyde bis(2-dimethylaminoethyl) mercaptal dihydrochloride. Substitution of approximately 378 parts of p-nitrobenzaldehyde for the p-chlorobenzaldehyde called for in Example 3A affords, by the procedure there detailed, p-nitrobenzaldehyde bis(2-dimethylaminoethyl) mercaptal dihydrochloride as a white solid melting at approximately 247°–248.5°. The product has the formula

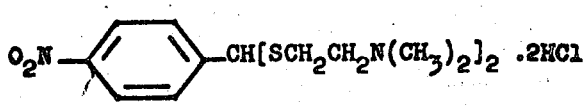

EXAMPLE 20

2,6-Dinitrobenzaldehyde bis(2-dimethylaminoethyl) mercaptal dihydrochloride. Substitution of approximately 491 parts of 2,6-dinitrobenzaldehyde for the p-chlorobenzaldehyde called for in Example 3A affords, by the procedure there detailed, 2,6-dinitrobenzaldehyde bis(2-dimethylaminoethyl) mercaptal dihydrochloride, having the formula

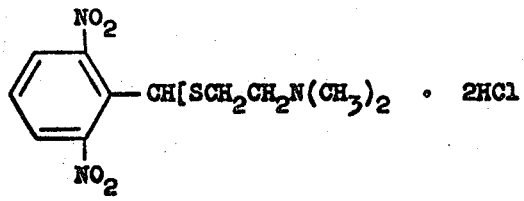

EXAMPLE 21

5-Chloro-2-nitrobenzaldehyde bis(2-diethylaminoethyl) mercaptal dioxalate. Substitution of 116 parts of 5-chloro-2-nitrobenzaldehyde and 212 parts of 2-diethylaminoethanethiol hydrochloride for the p-chlorobenzaldehyde and 3-dimethylamino-2-methylpropanethiol, respectively, called for in Example 10B affords, by the procedure there detailed, 5-chloro-2-nitrobenzaldehyde bis(2-diethylaminoethyl) mercaptal dioxalate melting at approximately 134.5°–135.5°. The product has the formula

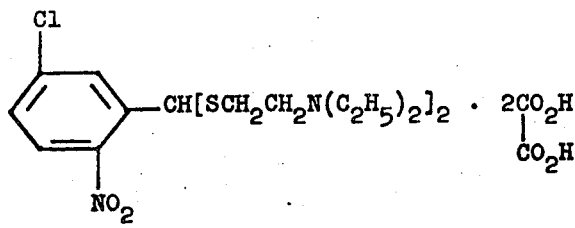

What is claimed is:

1. A compound of the formula

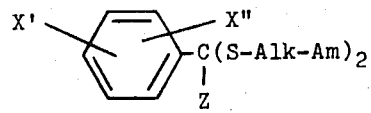

wherein Z represents hydrogen or methyl; X' represents halogen or nitro; X" represents hydrogen, halogen, or nitro; Alk represents alkylene containing more than 1 and fewer than 5 carbons; and Am represents di(lower alkyl)amino.

2. A compound according to claim 1 having the formula

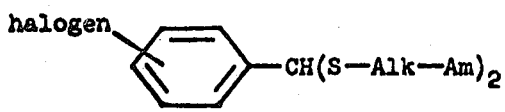

wherein Alk represents alkylene containing more than 1 and fewer than 5 carbons and Am represents di(lower alkyl)amino.

3. A compound according to claim 1 having the formula

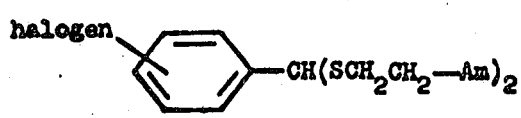

wherein Am represents di(lower alkyl)amino.

4. A compound according to claim 1 having the formula

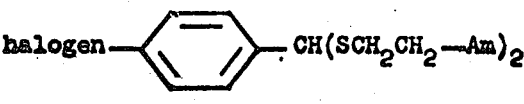

wherein Am represents di(lower alkyl)amino.

5. A compound according to claim 1 having the formula

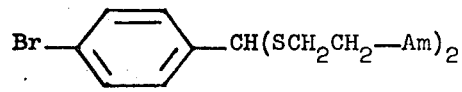

wherein Am represents di(lower alkyl)amino.

6. A compound according to claim 1 which is p-bromobenzaldehyde bis(2-diethylaminoethyl) mercaptal.

7. A compound according to claim 1 having the formula

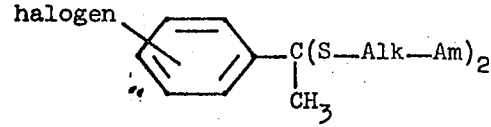

wherein Alk represents alkylene containing more than 1 and fewer than 5 carbons and Am represents di(lower alkyl)-amino.

8. A compound according to claim 1 which is p-chloroacetophenone bis(2-dimethylaminoethyl) mercaptal.

9. A compound according to claim 1 having the formula

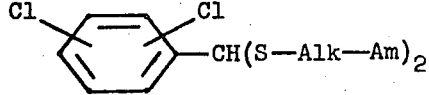

wherein Alk represents alkylene containing more than 1 and fewer than 5 carbons and Am represents di(lower alkyl)amino.

10. A compound according to claim 1 having the formula

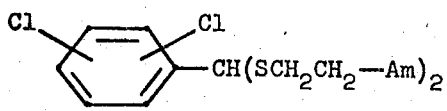

wherein Am represents di(lower alkyl)amino.

11. A compound according to claim 1 which is 2,4-dichlorobenzaldehyde bis(2-diisopropylaminoethyl) mercaptal.

12. A compound according to claim 1 having the formula

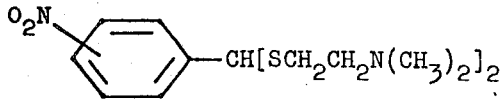

13. A compound according to claim 1 which is p-nitrobenzaldehyde bis(2-dimethylaminoethyl) mercaptal.